(12) United States Patent
Ko et al.

(10) Patent No.: US 7,343,555 B2
(45) Date of Patent: Mar. 11, 2008

(54) SYSTEM AND METHOD FOR DELIVERY OF DOCUMENTS OVER A COMPUTER NETWORK

(75) Inventors: John D. Ko, Fairfax, VA (US); Bruce M. Boghosian, Lexington, MA (US); Carol A. Traynor, Fairfax, VA (US)

(73) Assignee: Cincro Communications Corporation, Fairfax, VA (US)

( * ) Notice: Subject to any disclaimer, the term of this patent is extended or adjusted under 35 U.S.C. 154(b) by 404 days.

(21) Appl. No.: 10/003,348

(22) Filed: Dec. 6, 2001

(65) Prior Publication Data

US 2002/0112082 A1 Aug. 15, 2002

Related U.S. Application Data

(60) Provisional application No. 60/251,584, filed on Dec. 7, 2000.

(51) Int. Cl.
*G06F 15/00* (2006.01)
*G06F 17/00* (2006.01)

(52) U.S. Cl. .................. 715/517; 715/520; 715/522; 709/226; 709/246

(58) Field of Classification Search ............. 715/517, 715/522, 520; 709/228, 246, 226
See application file for complete search history.

(56) References Cited

U.S. PATENT DOCUMENTS 5,727,159 A * 3/1998 Kikinis ................. 709/246
5,764,235 A * 6/1998 Hunt et al. ............. 345/428
5,778,372 A 7/1998 Cordell et al. ............. 707/100
5,845,303 A * 12/1998 Templeman .............. 715/517
5,880,740 A 3/1999 Halliday et al. .......... 345/435
6,076,109 A * 6/2000 Kikinis ................... 709/228
6,199,082 B1 * 3/2001 Ferrel et al. .............. 715/522
6,665,841 B1 * 12/2003 Mahoney et al. ......... 715/520
6,829,646 B1 * 12/2004 Philyaw et al. ........... 709/228

OTHER PUBLICATIONS

Pham et al., A situated computing framework for mobile and ubiquitous multimedia access using small screen and composite devices, ACM International Conference on Multimedia, Oct. 2000, pp. 323-331.*

* cited by examiner

*Primary Examiner*—William Bashore
(74) *Attorney, Agent, or Firm*—Pillsbury Winthrop Shaw Pittman, LLP

(57) ABSTRACT

A system and method for delivering a document by a first computer to a second computer over a computer network. A method of the present invention includes the following steps: (1) decomposing the document into nodes in accordance with a document model of the document; (2) associating the nodes with a virtual layout space having one or more regions; and (3) scheduling delivery of the nodes. Preferably, each of the nodes is associated with at least one region, and each of the nodes further includes one or more levels of resolution. In other embodiments, the method may include one or more additional steps such as, for example, (4) grouping the nodes in multiple batches each of which has at least one node. Preferably, one of the batches has all the nodes.

17 Claims, 11 Drawing Sheets

SYSTEM AND METHOD FOR DELIVERY OF DOCUMENTS OVER A COMPUTER NETWORK

This application claims the benefit of U.S. Provisional Application No. 60/251,584 filed Dec. 7, 2000, which is incorporated herein by reference in its entirety.

BACKGROUND

1. Field of the Invention

The present invention relates to data processing, and more particularly, to a system and method for delivery of documents over a computer network.

2. Background of the Invention

The Internet is a well known global computer network through which information can be exchanged between two parties. The World Wide Web (WWW) is probably the most utilized component of the Internet. Each day, millions of users access the WWW to obtain information that can comprise one or more of text, images, sound, and other data. The information that can be exchanged over the Internet may be referred herein interchangeably as document. The information or document is typically stored in a database or memory that is associated with a server computer. The information can be presented as a web page. The web page is then made available on a web site of the server computer. Users can view the web page using a web browser associated with a client computer. Well known web browsers include the Navigator of Netscape Communications, Inc. and the Internet Explorer of Microsoft Corporation.

The dominant information that is being transferred over the Internet is the Hypertext Markup Language (HTML) document. Since the introduction of the first widely adopted HTML browser, Mosaic, the need for speeding-up the deliver of HTML documents over the Internet has been a prevalent problem. Unlike other computer hardware components, the Internet connectivity has been very slow in improvement. For example, since the early 1995, CPU computing power has increased by a factor of 20×, disk capacity has increased by a factor of 100×, and memory size has grown by a factor of 4×. Sadly, however, average Internet connection speed has increased by a factor of only 2×. This imbalance has caused great stress in the kind and manner in which content is delivered and viewed over the Internet.

In response to this problem, content developers have adopted a model of creating minimized content. Yahoo.com is a premier adopter of this model, where the HTML page size is kept to a small size and virtually all graphics are missing. The result is that the general audience, who lacks high-speed broadband Internet connectivity, are forced to either view uninteresting content or experience unbearable download wait periods.

With the scaling of the Internet users, many companies have recently begun to offer solutions to scaling or speeding-up the access to the Web information. For example, caching solutions were offered to scale the back-end HTML web servers, so that they can meet the millions of hits per day. More recently, edge network caching solutions offered ways to not only speed access to content, but also provide rapid scaling and redundancy. Today, the industry has recognized that the majority of Internet users are mostly limited by the "last mile" connection, namely their modem connection to an ISP (Internet Service Provider). Using novel page anticipation and data reduction techniques such as compression and delta updating, emerging solutions are making progress in minimizing the amount of information that needs to be passed from an origin web server to the end user. However, all existing solutions to the "last mile" problem do not scale, as the amount of information grows or the network connection slows down.

Web pages are typically formatted using the well known HTML. Other formats can include XML, PDF, Flash, MS WORD, and Postscripts. A typical web page has about 40 to 240 kilobytes (KB) of information, which can take about eight to 48 seconds to download by "thick" clients having network connection speed of 56 to 128 kilobytes per seconds (kbps). In addition, thick clients usually has large screens like VGA or SVGA with screens of 1024 by 768 pixels. As a result, most web pages are not accessible for viewing by "thin" clients with lower bandwidths (9.6 kbps to 14.4 kbps network connection speed) and smaller screen sizes (160× 160 to 320×240). Examples of thin clients include wireless devices such as personal digital assistants (PDAs) and pocket PCs. Even if these thin client computers can access the web pages, it often takes an impracticably long time to download. For example, at network connection speed of 14.4 kbps, it could take 240 seconds to download a web page, which is roughly about five times slower than the speed at which a thick client can download the same amount of information.

To accommodate thin clients, a number of partial solutions have been implemented. For example, in addition to their regular websites designed for thick clients, some content providers create and maintain a second website specifically for thin clients. The design and implementation of the second website can be very expensive and labor intensive. More importantly, the second website is often a "watered down" version of the first website. In other words, the second website does not contain as much information as the first website. The second website tend to contain mostly, if not exclusively, textual content. As a result, users accessing the second website are often dissatisfied with the content they receive. This in turn has deterred users from using thin clients from accessing the WWW for information. Ultimately, wireless devices are basically limited to getting from the WWW text-based messaging, e-mails, and web clippings.

The inability to efficiently deliver multimedia web pages to wireless devices has led to development of new infrastructure. The new infrastructure, either in hardware or software, or both, can be very expensive.

In response to this problem, an industry consortium, called the WAP Forum, produced an entirely new set of networking protocols called the Wireless Application Protocol (WAP), and an associated new web page language called the Wireless Markup Language (WML). WAP is an application environment and set of communication protocols for wireless devices designed to enable manufacturer-, vendor-, and technology-independent access to the Internet and advanced wireless telephony services. WAP provides wireless Internet access through digital cellular networks, giving network users a menu driven method for downloading information, such as flight schedules and bank account balances, to wireless devices from the Internet.

A WAP device, such as a wireless telephone, will be configured to communicate with the WWW only through the intermediary of a particular WAP gateway. These gateways accept WAP communications from WAP devices, transmit requests to WML servers using standard HTTP protocol, compile the retrieved data into WML bytecode, and transmit this back to the devices. That is, WAP devices never see the raw WML; they deal only with WML bytecode. This approach leads to bandwidth savings, since the WML bytecode is substantially more compact than the raw WML. It also allows for a less complex browser, since the wireless device need only deal with data that has been compiled, and hence which may be presumed syntactically correct. To provide web pages to WAP devices under this scheme, content providers must maintain separate WML versions of their web pages, and configure their web-server software to serve them with the correct MIME type.

Stated in another way, WAP's basic strategy is to shrink a web page in a static way so that the information on the web page can be viewed by the micro-browser of a WAP device. For example, when a web page is accessed by a WAP device, images on the web page are either taken out completely or are shrunk to a very small image. Text on the web page is either lined up in a very tall column or in a very long row for viewing by the micro-browser. As a result, WAP does not provide a complete solution for thin client's access to the WWW. Furthermore, WAP involves manual process, templates, preprocessing, etc., which can be expensive and labor intensive. More importantly, users of WAP devices do not get the web page that was originally designed.

In spite of its industry support, the WAP/WML approach suffers from all of the usual difficulties associated with the imposition of new protocols that depart from tried-and-tested software engineering practices. For example, some server-side difficulties include:

(1) The server is required to create WML versions of their HTML pages, thus substantially increasing the labor and expense of maintaining web pages.

(2) WML allows only a very small set of layout formats, making it difficult for servers to customize content, and increasing the likelihood that vendors will introduce their own extensions to the standard to fix the problem.

(3) Unlike HTML, WML has a very unforgiving syntax. Even the slightest syntax error will prevent the WAP gateway from compiling the WML into bytecode. Moreover, since this compilation occurs on the WAP gateway, the server receives no feedback about such errors. It is possible for the server to use XML validators to check their WML (since WML is a subset of XML), but this solution is less than ideal when the WML needs to be generated dynamically—from a database, for example. Content providers are often forced to resort to the extreme measure of checking their pages' appearance on each member of the millions of wireless devices, to be sure that they render as intended.

(4) Most egregiously, each WAP device has its own page-length limit on the amount of WML that it may receive. Worse, this limit is imposed not on the WML source, but rather on the compiled WML bytecode. For example, the Nokia 7110 imposes a limit of 1397 compiled bytes of WML.

(5) The protocol introduces an entirely new monochrome image format called WBMP (Wireless BitMaP) that is unsupported by major graphics software packages.

(6) The protocol does not support cookies, making it impossible for the server to access persistent (longer than one session) information on the client.

(7) There is still some resistance in the U.S. market to adopting the WAP/WML standards. Sprint PCS and many other U.S. carriers have a partnership with Phone.com to provide a WAP gateway and a browser for their customers. While Phone.com is a member of the WAP Forum, they have also encouraged developers to use their own proprietary language called Handheld Device Markup Language (HDML). Indeed, not all of Phone.com's products are completely WAP compliant.

In addition, there are client-side difficulties which include:

(8) Web pages viewed by clients are restricted to only a few limited formats (see disadvantage number (2) above), and monochrome images (see disadvantage number (5) above). The client's web-surfing experience is thus dramatically curtailed. At present, most users restrict their use of this medium to electronic mail and other text-based processing, for precisely this reason. In short, clients simply do not see the real WWW.

(9) The lack of support for cookies means that clients must retype they user name and password each time they open a new session with a secure web page (see disadvantage number (6) above). This is particularly unfortunate, given the relative difficulty of entering text on certain small wireless devices.

Another partial solution to provide web pages to thin clients involves the compression and caching of information on the web pages. The rationale behind this solution is that faster access can be had if enough information is compressed and cached. The reality, however, is that not all information on the WWW is compressible or cacheable. Furthermore, some information even if compressible and cacheable, can not be reduced to a satisfactory ratio. As a result, compression and caching of the information provide inconsistent results. Another disadvantage is that sometimes the compression modules have to be integrated into the documents. Still another disadvantage is that caching has to be integrated within a proxy server, a network server, routers, and other components.

SUMMARY OF THE INVENTION

The present invention is a system and method for delivery of documents over a computer network. The present invention enables a thin client to retrieve any and all documents over a computer network regardless of the available bandwidth and the size of the documents. In the context of the WWW, for example, the present invention can liberate content providers from having to maintain more than one web site to separately accommodate wireless and broadband networks.

One object of the present invention is to provide an improved method of communicating HTML documents to low-bandwidth clients. Unlike WAP/WML, the present invention does not introduce any new protocols or markup languages. The present invention allows servers to maintain only a single HTML document, and it allows thin clients with a small bandwidth to view unabridged web pages. The present invention can be easily adapted to work on the current generation of WAP devices by providing more processing power and memory. As the ever-growing pool of wireless users become increasingly frustrated with the limitations of WAP/WML, however, it is believed that the users will demand for such increased capabilities. When manufacturers respond with wireless devices that have more processing power and memory, the approach of the present invention will scale well and provide users with a satisfying web-surfing experience, while WAP/WML is likely to remain shackled by the severe limitations of its own protocol.

One preferred embodiment of the present invention enables thin clients to receive from the WWW documents that are hitherto available only to high-bandwidth computers with large display devices. The preferred embodiment of the present invention eliminates the need for content providers to create and maintain more than on website to accommodate clients of varying capabilities.

The preferred embodiment of present invention includes a server-side software module (the server module) and a client-side software module (the client module). The server module and the client module are associated with a server computer (the first computer) and a client computer (the second computer), respectively. The server module uses a virtual layout space (VLS) and optionally a spatial lookup table (SLT) to relate various components of a document requested by the client.

A preferred method of the present invention includes the following steps: (1) decomposing the document into nodes in accordance with a document model of the document; (2) associating the nodes with a virtual layout space having one or more of regions; and (3) scheduling delivery of the nodes. Preferably, each of the nodes is associated with at least one region, and each of the nodes further includes one or more levels of resolution. In other embodiments, the method may include one or more additional steps such as, for example, (4) grouping the nodes in multiple batches each of which has at least one node. Preferably, one of the batches has all the nodes.

DETAILED DESCRIPTION OF THE INVENTION

Overview

Figure 1:
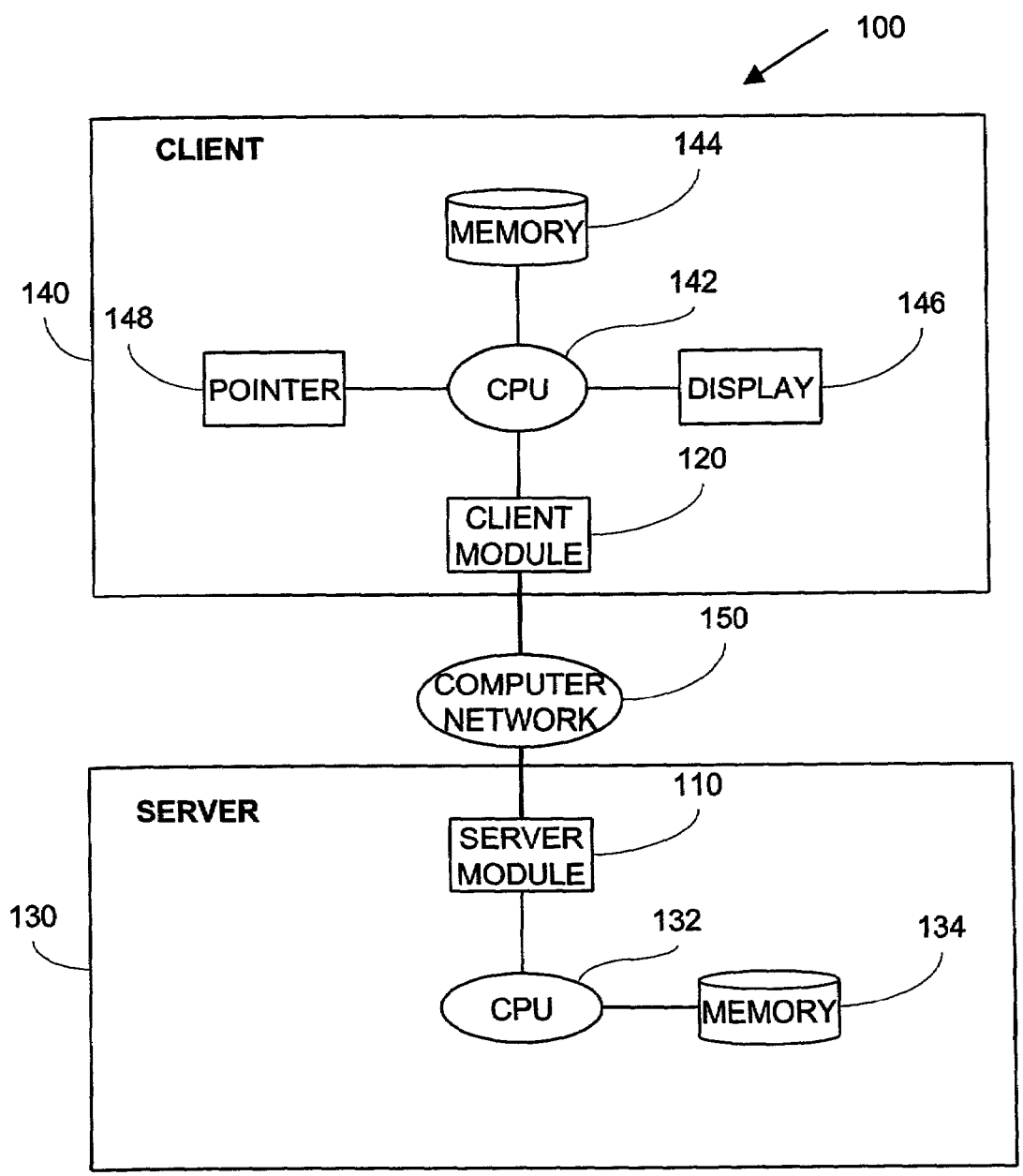
FIG. 1 is a schematic diagram showing the general architecture of a system of the present invention.

FIG. 1 is a schematic diagram showing the general architecture of a system of the present invention. System 100 is a preferred embodiment of the present invention. System 100 comprises server module 110 and client module 120. Server module 110 is associated with server 130, which comprises server CPU 132 and memory 134. Client module 120 is associated with client 140, which comprises client CPU 142, memory 144, display 146, and pointer 148.

Server 130 and client 140 can communicate with one another over computer network 150. Computer network 150 may be a local area network, a wide area network, the Internet, or another network in which two or more computers can exchange information. An exemplary embodiment of the present invention uses the well known TCP/IP communications protocol over the Internet.

Although server 130 and client 140 are illustrated in FIG. 1 and described herein as two parties in a server-client relationship, it is noted that server 130 and client 140 can also have a peer-to-peer relationship. In other words, server 130 and client 140 can both be clients of one network. Similarly, in a multiple networks environment both server 130 and client 140 can be servers. In the claims recited below, server 130 is referred to as the first computer, and client 140 is referred to as the second computer.

Server 130 can be, for example, a UNIX server from Sun Microsystems, Inc. of Palo Alto, Calif. CPU 132 can be, for example, an Intel Pentium® III processor, manufactured by Intel Corp. of Santa Clara, Calif. As another example, CPU 132 can be an Application Specific Integrated Circuit (ASIC). Memory 134 may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof.

Characteristics of server-side software module 110 will be made apparent in the following paragraphs, the appended drawings, and the claims.

Client 140 can be one of several types of devices each of which having a wide range of capabilities. Examples of the types of devices that may be used as clients 140 include those summarized in Table 1 below.

TABLE 1

Examples of Suitable Clients

| Types of Client | Color (bits) | CPU Speed (MHz) | Screen Size (pixels) | Connectivity (Kbps) |
| --- | --- | --- | --- | --- |
| PDA | 1 to 8 | 10 to 20 | 160 × 60 | 9.6 |
| Pocket PC | 12 to 16 | 100 to 200 | 320 × 240 | 14.4 |
| Handheld PC | 16 | 200 to 500 | 640 × 240 | 14.4 |
| Laptop PC | 24 | 500 to 800 | 1024 × 768 | 56 |
| Wire Line Computer | >24 | >800 | >1024 × 768 | >56 |

The color, CPU speed, screen size, and network connectivity associated with each client are categorically described herein as characteristics of the client.

As indicated in Table 1, pocket PC's are examples of clients that can be used to implement to present invention. A pocket PC has many constraints. For example, the screen size of a typical pocket PC is 320×240, which can display low resolution images or limited number of textual characters. Another major constraint associated with the pocket PC is its network connectivity. Currently, the standard network connection that the pocket PC has is that which is available to a digital wireless telephone, which is at 14.4 Kbps. In a rare situation, a wireless telephones can have network connection at 128 Kbps, but that connection can be prohibitively expensive. Furthermore, the higher network connectivity is available only in a limited number of metropolitans. Another constraint associated with the Pocket PC is its CPU clock speed.

Characteristics of client module 140 will be made apparent in the following paragraphs, the appended drawings, and the claims.

Preferred Embodiment—Delivery of HTML Documents

A preferred embodiment of the present invention allows a server (the first computer) to deliver information (the document) to a client (the second computer) over a computer network using the well known HTTP protocols. Unlike WAP/WML, the preferred embodiment of the present invention does not introduce any new protocols and markup languages. The preferred embodiment allows the server to maintain only a single HTML document, and it allows the client to view unabridged web pages.

The preferred embodiment overcomes bandwidth limitations by allowing a user of the client to view an entire HTML document only at low resolution, and to increase resolution only by zooming in to a portion of the web page. To some extent, this approach is perfectly appropriate for the current generation of wireless devices, many of which have only low resolution screens. When the user first accesses the document, he or she may see the entire page, but at a very low resolution—perhaps consistent with what their screen will allow. Only gross features of images and large text will be seen; smaller text may appear only as shaded areas, sufficient only to let the user know that they may zoom in to find text there. The user's primary means for navigating about the page can be facilitated by a pan/zoom user interface (PZUI) of a client-side software. The client-side software user may be a browser. The PZUI can be part of a downloadable pug-in module to existing browsers. Existing browsers that can be used to work with the client-side software module of the present invention include, for example, Internet Explorer and Netscape Navigator.

When the client requests an HTML document from the server using the preferred embodiment, the request is transmitted directly to the server. If the server recognizes the request as one from a low-bandwidth or thin client equipped with the client-side software module of the present invention, the server shunts the request to server-side software module. The server-side software module runs alongside the standard web server, and catches the push of the HTML document, along with information about the client.

In the preferred embodiment, the server-side software module has four principal functions, namely (1) organizing web page data; (2) associating spatial organization of web page data; (3) creating multi-resolution representation; and (4) outlining delivery protocol. These four principal functions of the server-side software module are explained in more details below.

Figure 2:
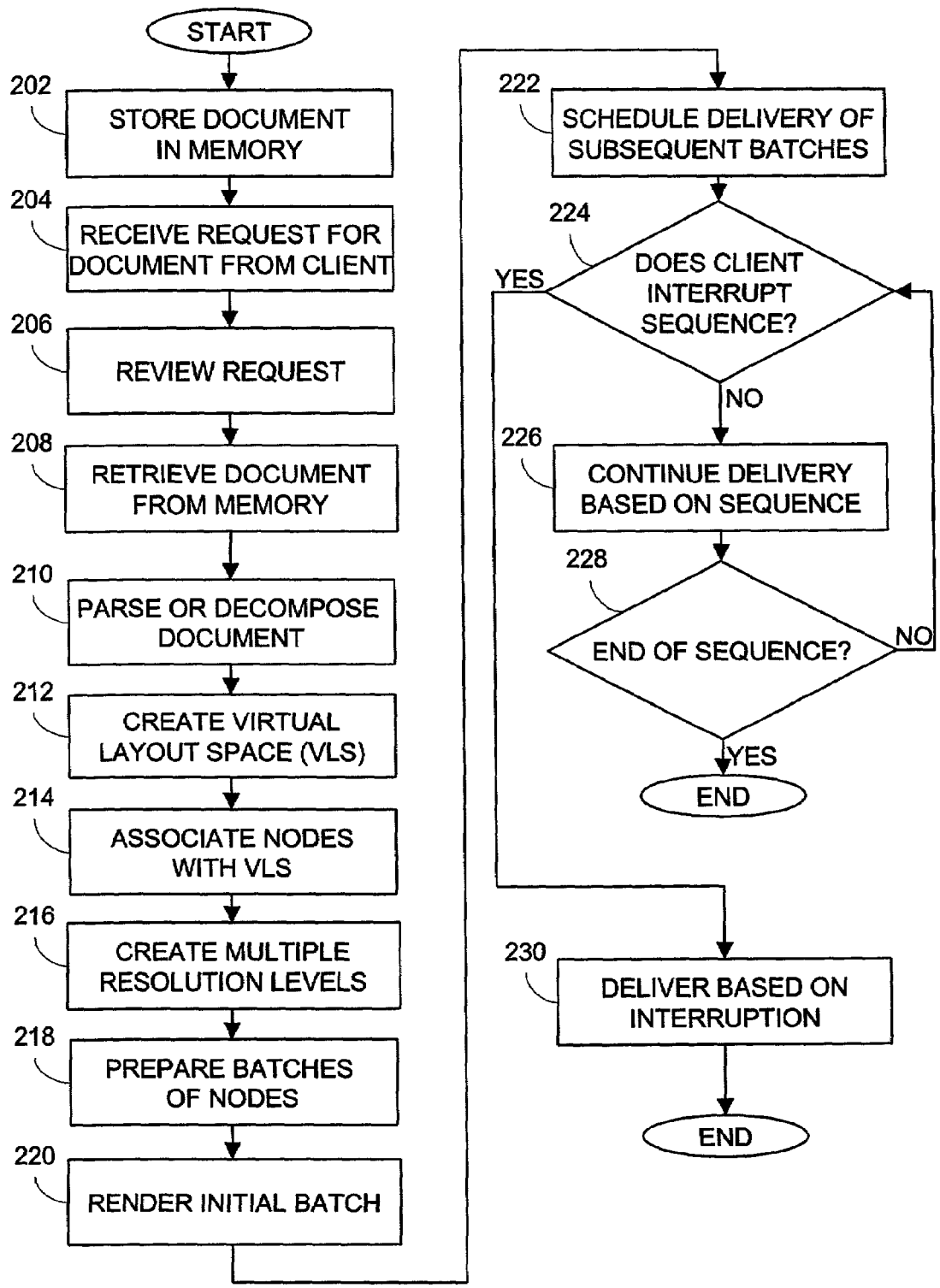
FIG. 2 is a flowchart showing general steps involved in using the preferred embodiment of the present invention for server 130 to deliver a document to client 140 over computer network 150.
Figure 3:
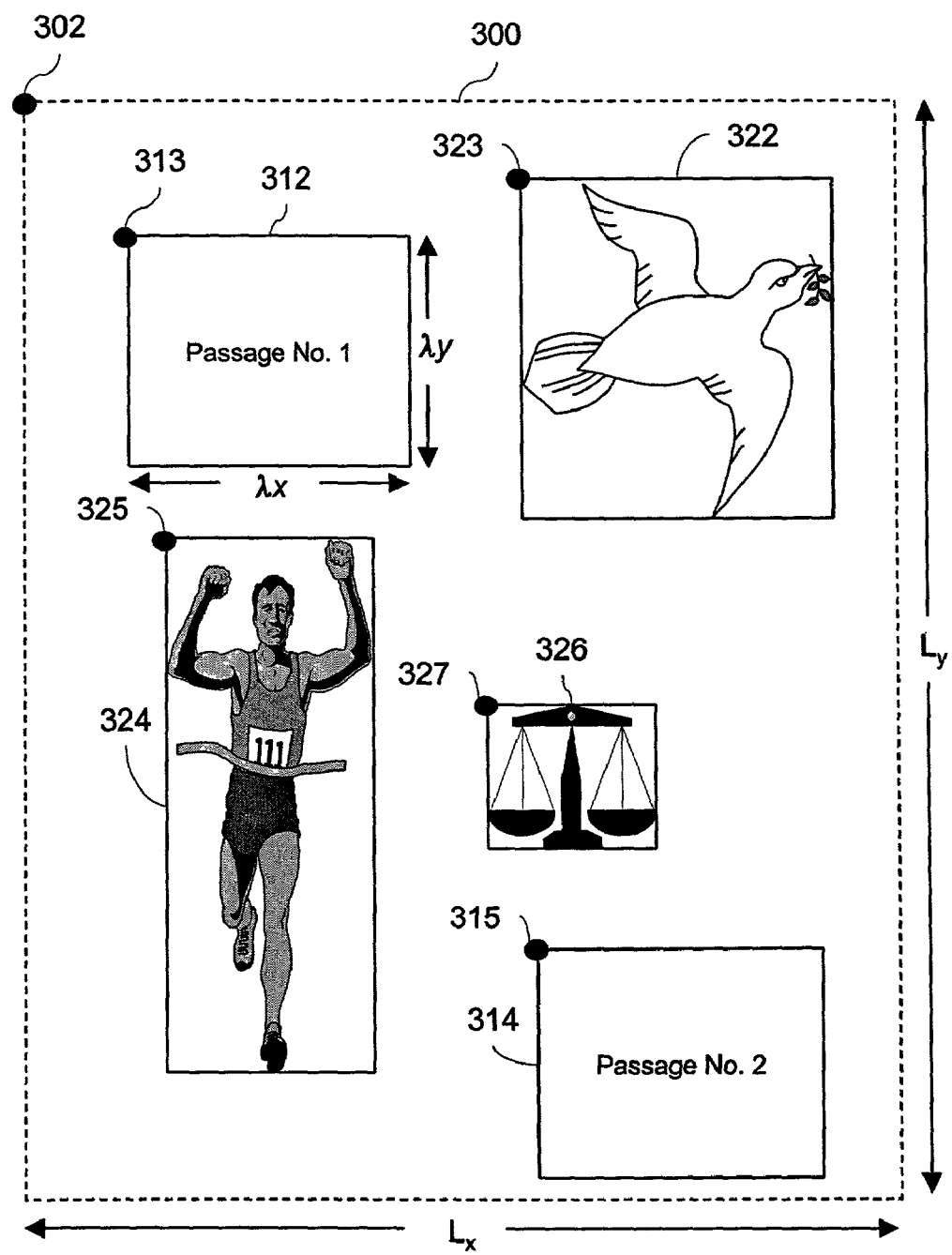
FIG. 3 is a schematic diagram of a document that can be delivered in accordance with the present invention.

FIG. 2 is a flowchart showing general steps involved in using the preferred embodiment of the present invention for a server to deliver a document to a client over a computer network. For example, the document may be document 300 that is schematically depicted in FIG. 3. Document 300, for illustration purposes, is an HTML document. Documents of other formats, including XML, PDF, Flash, MS WORD, Postscripts, and the like, can also be processed and delivered in accordance with different embodiments of the present invention.

In step 202, document 300 is stored in a memory associated with server 130. For example, document 300 may be stored in memory 134 that is associated with server 130 as shown in FIG. 1. Although memory 134 is depicted in FIG. 1 as a component of server 130, memory 134 can be located elsewhere, as long as memory 134 is accessible to server 130. Document 300 contains a tree data structure. Document 300 may be, for example, the home page of a content provider associated with server 130.

In step 204, a request for document 300 is received by server 130 from client 140 over computer network 150. The request may be made, for example, when a user of client 140 keys in a universal resource locator (URL) associated with server 130. As part of the request or as a supplement to the request, characteristics of client 140 can be provided to server 130. For example, the request can comprise the size of display 146 and the network connection speed between client 140 and server 130.

In step 206, server 130 reviews the request that includes the characteristics of the client. Preferably, the review of the request is performed by server module 110.

In step 208, server 130 retrieves document 300 from memory 134. Retrieval of document 300 by server 130 can be performed using any known method.

Tree Organization of Web Page Data (Document Modeling)

In step 210, server module 110 parses or decomposes document 300 into a plurality of nodes or components (or elements) in accordance with a document model associated with document 300. The terms nodes, components, and elements may be used interchangeably herein. Document 300 can comprise text and image nodes. As shown in FIG. 3, document 300 comprises five nodes or elements, namely, first text node 312, second text node 314, first image node 322, second image node 324, and third image node 326.

The original data structure of document 300 can be viewed using, for example, an HTML editor. One example of a suitable HTML editor is Adobe Go Live, which enables its users to view the tree data structure of any HTML document. Nodes of the tree data structure represent elements or tags in HTML documents, and the links of the tree between any two nodes represent relationships between these elements.

While the tree representation of document 300 contains information about the sizes and relative positions of the elements of document 300, it should be noted that the tree data structure specifies no information about the absolute positions of these elements. The absolute positions are usually determined by client 140's web browser. This can be seen by the way that elements sometimes shift positions when client 140 resizes a web browser. In the preferred embodiment, however, it is server 130 that must specify the natural dimensions for document 300. While these dimensions may depend on the client hardware—since this information is transmitted as part of client 140's request—the dimensions must be imposed on the server side.

Figure 4:
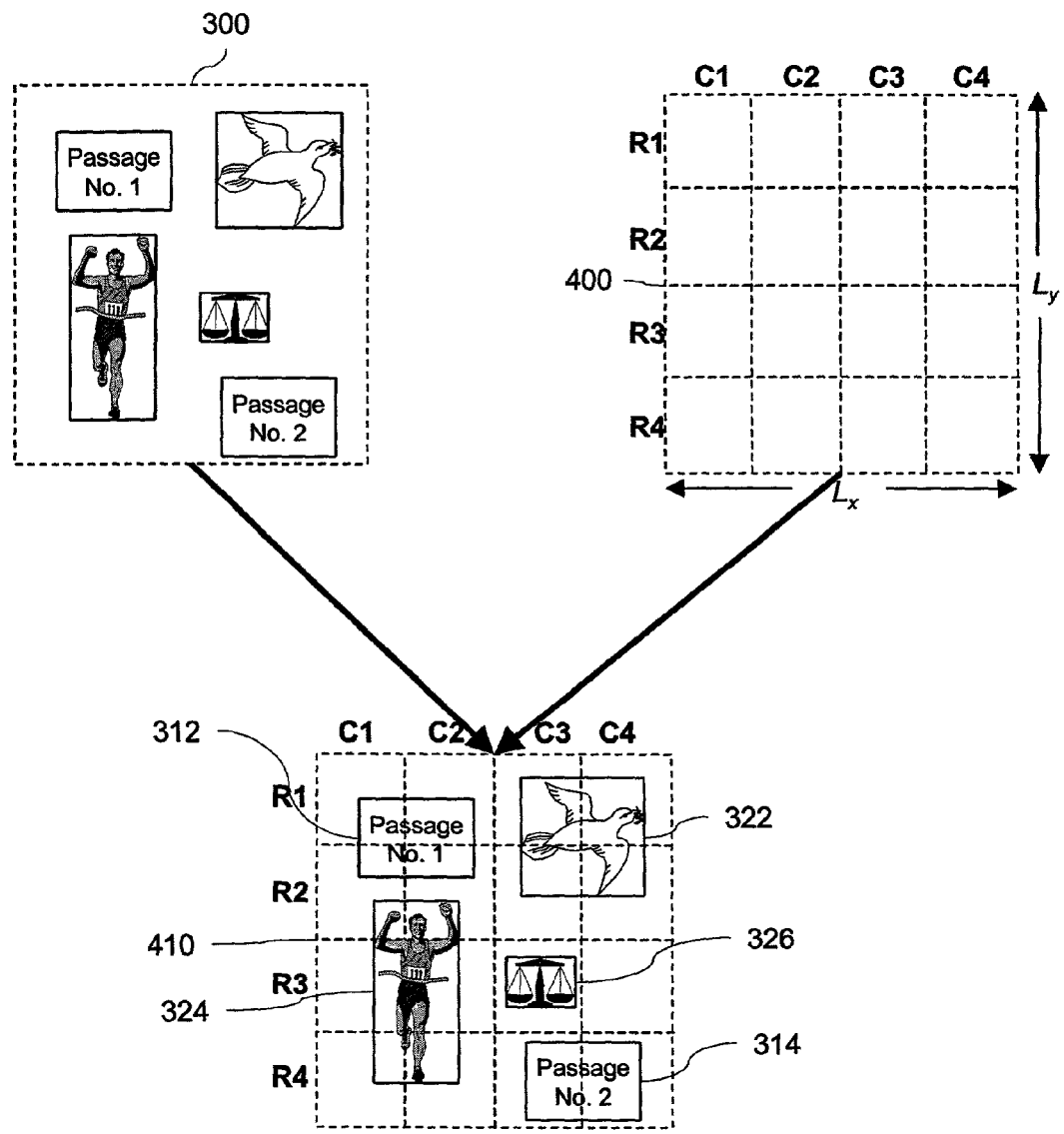
FIG. 4 is a schematic diagram showing a VLS associated with the document shown in FIG. 3.

In step 212, server module 110 creates a virtual layout space (VLS) for document 300. That is, server 130 associates the VLS to the requested document 300, with a particular width $L_x$ and height $L_y$, specified in pixels. FIG. 4 is a schematic diagram showing VLS 400 with width $L_x$ and height $L_y$, specified in pixels, which is the same as document 300, as shown in modified document 410.

All references to the width of client 140's window are replaced by absolute widths. For example, all the elements on document 300 can be arranged in a table whose width field is set to 100%. Server module 110 would replace this width field by the fixed number $L_x$, specified by server 130. As the parsing or decomposition proceeds, a modified tree is created, containing a superset of the information in the original tree.

Given VLS 400, server module 110 goes on to compute the absolute positions of the various elements of document 300 on VLS 400, and adds this information to the modified tree. Since the absolute position of each element may depend on all of the HTML that preceded it, these computations must be made by parsing the entire HTML document. This may be accomplished by one-pass forward parsing, in a manner that is essentially mandated by the HTML language specification, and used by all modern web browsers.

Thus, when the parsing or decomposition is complete, the modified tree entry for each element will contain the absolute position (x, y) of a reference point of the element in addition to the size of the element in pixels ($\lambda_x$, $\lambda_y$). The reference point can be, for example, the upper left-hand corner of the element. Table 2 shows an example of the coordinates and sizes of the elements of document 300. For illustration purposes, the upper-left corner 302 of document 300 have coordinates of x=0 and y=0. Furthermore, for illustration purpose, $L_x$ is 470 pixels and $L_y$ is 590 pixels.

The upper-left corners (reference points) of nodes 312, 314, 322, 324, and 326, depicted in FIG. 3 as corners 313, 315, 323, 325, and 327, respectively, have (x, y) coordinates and ($\lambda_x$, $\lambda_y$) dimensions summarized in Table 2 below.

TABLE 2

Coordinates and Sizes of Nodes of Document 300

| Node | x | y | $\lambda_x$ | $\lambda_y$ |
|---|---|---|---|---|
| 312 | 55 | 70 | 150 | 122 |
| 314 | 275 | 455 | 150 | 122 |
| 322 | 268 | 40 | 168 | 180 |
| 324 | 75 | 230 | 110 | 288 |
| 326 | 248 | 320 | 90 | 80 |

Spatial Organization of Web Page Data

Server module 110 also computes an inverse map: that is, server module 110 breaks VLS 400 into spatial regions or tiles. For example, as shown in FIG. 4, VLS 400 as shown has 16 regions, namely, R1C1, R1C2, R1C3, R1C4, R2C1, R2C2, R2C3, R2C4, R3C1, R3C2, R3C3, R3C4, R4C1, R4C2, R4C3 and R4C4. Together, these 16 regions cover the entire document 300.

Server module 110 can also create a spatial lookup table (SLT) that specifies which HTML elements are present in each region of VLS 400.

In step 214, server module 110 associates each node of document 300 with at least one region of VLS 400. For example, first text node 312 can be associated with regions R1C1, R1C2, R2C1, and R2C2. Similarly, first image node 322 can be associated with regions R1C3, R1C4, R2C3, and R2C4. A spatial lookup table (SLT) may be used to summarize the associations of the nodes of document 300 with the regions of VLS 400. For example, the various nodes and regions shown in FIG. 4 may be summarized in the SLT shown below as Table 3.

TABLE 3

An Example of a Spatial Lookup Table

| Region | Text Node | Image Node |
|---|---|---|
| R1C1 | 312 | None |
| R1C2 | 312 | None |
| R1C3 | None | 322 |
| R1C4 | None | 322 |
| R2C1 | 312 | 324 |

TABLE 3-continued

An Example of a Spatial Lookup Table

| Region | Text Node | Image Node |
|---|---|---|
| R2C2 | 312 | 324 |
| R2C3 | None | 322 |
| R2C4 | None | 322 |
| R3C1 | None | 324 |
| R3C2 | None | 324 |
| R3C3 | None | 326 |
| R3C4 | None | None |
| R4C1 | None | 324 |
| R4C2 | None | 324 |
| R4C3 | 314 | None |
| R4C4 | 314 | None |

Alternatively, the various nodes and regions shown in FIG. 4 may be summarized in the alternative SLT shown below as Table 4.

TABLE 4

Alternative Example of a Spatial Lookup Table

| Node | Region |
|---|---|
| 312 | R1C1, R1C2, R2C1, R2C2 |
| 314 | R4C3, R4C4 |
| 322 | R1C3, R1C4, R2C3, R2C4 |
| 324 | R2C1, R2C2, R3C1, R3C2, R4C1, R4C2 |
| 326 | R3C3 |

As discussed above, server module 110 of the present invention is able to parse document 300 to compute absolute coordinates (x, y) of the reference points e.g., the upper left-hand corners, of each element of document 300—both graphical and textual. Server module 110 also maintains a data structure reflecting a spatial organization of the web page. To create this, it breaks the VLS into spatial regions or tiles. Each region, for VLS 400 shown in FIG. 4, has dimensions $M_x=L_x/4$ (4 columns) and $M_y=M_y/4$ (4 rows).

Server module 110 computes the labels of all regions that intersect each node, and adds those to the modified tree data structure. For example, since first text node 312 intersects of falls within regions R1C1, R1C2, R2C1 and R2C2, these regions are added to the modified tree data structure for this image. These regions are listed in Table 3 and/or Table 4 above.

Table 3 and Table 4 can be regarded as injective maps from the web page elements or nodes into VLS 400. Server module 110 also computes the inverse of this map; that is, it determines the list of nodes that intersect each region.

Given any location (x, y) on VLS 400, it is straightforward to compute the label of the region that contains it. Recalling that the region size is $M_x$ by $M_y$, the desired region label is (X, Y), where $$X=\lfloor x/M_x \rfloor, \text{ and } \lfloor Y=y/M_y \rfloor$$

Once this region label is known, the region label may be used as a key into the SLT, from which the numbers of all the elements that are contained in that region can be obtained.

Multi-resolution Representation

Figure 5:
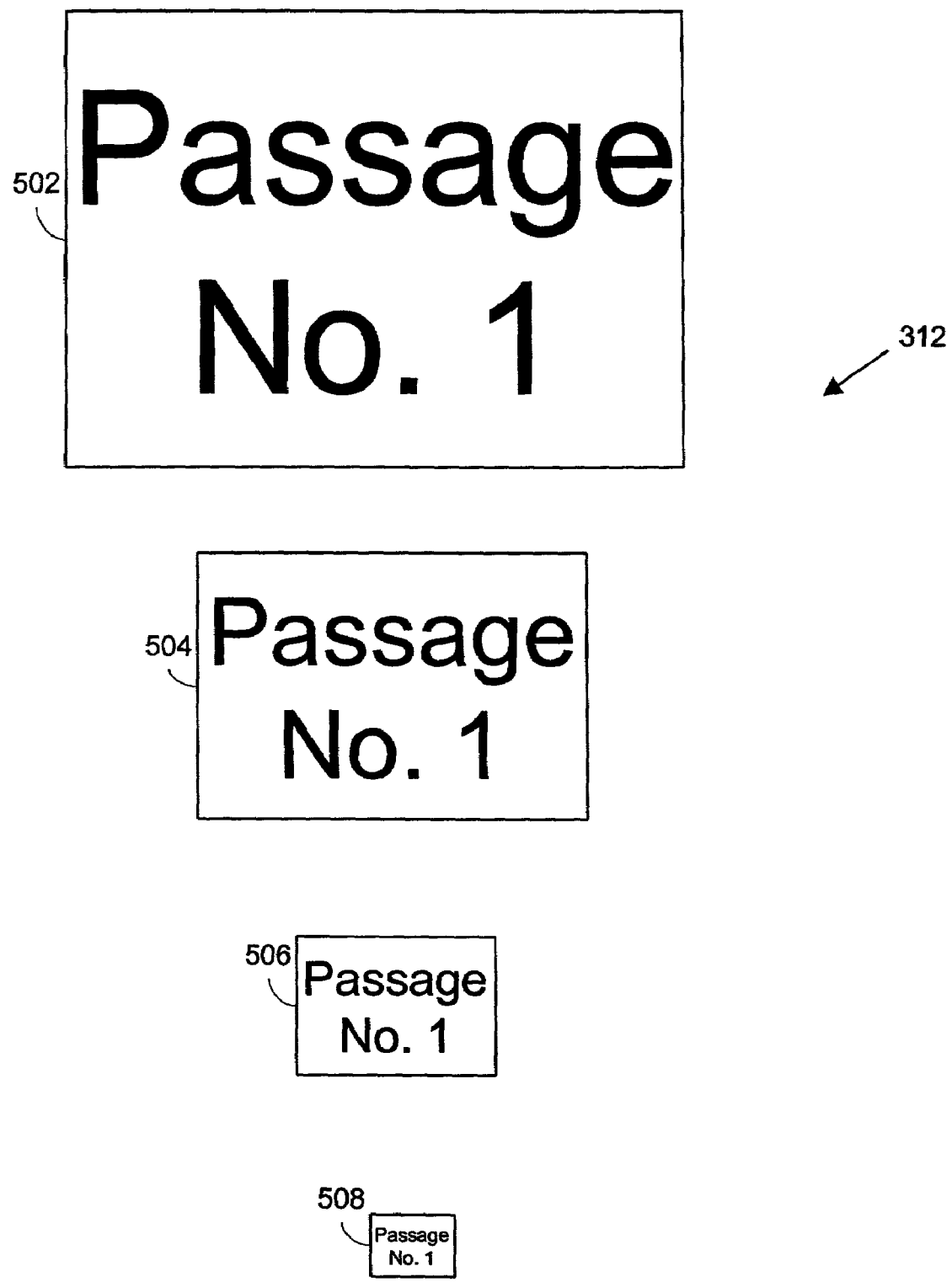
FIG. 5 is a schematic diagram showing four different resolution levels associated with a text node of the document shown in FIG. 3.
Figure 6:
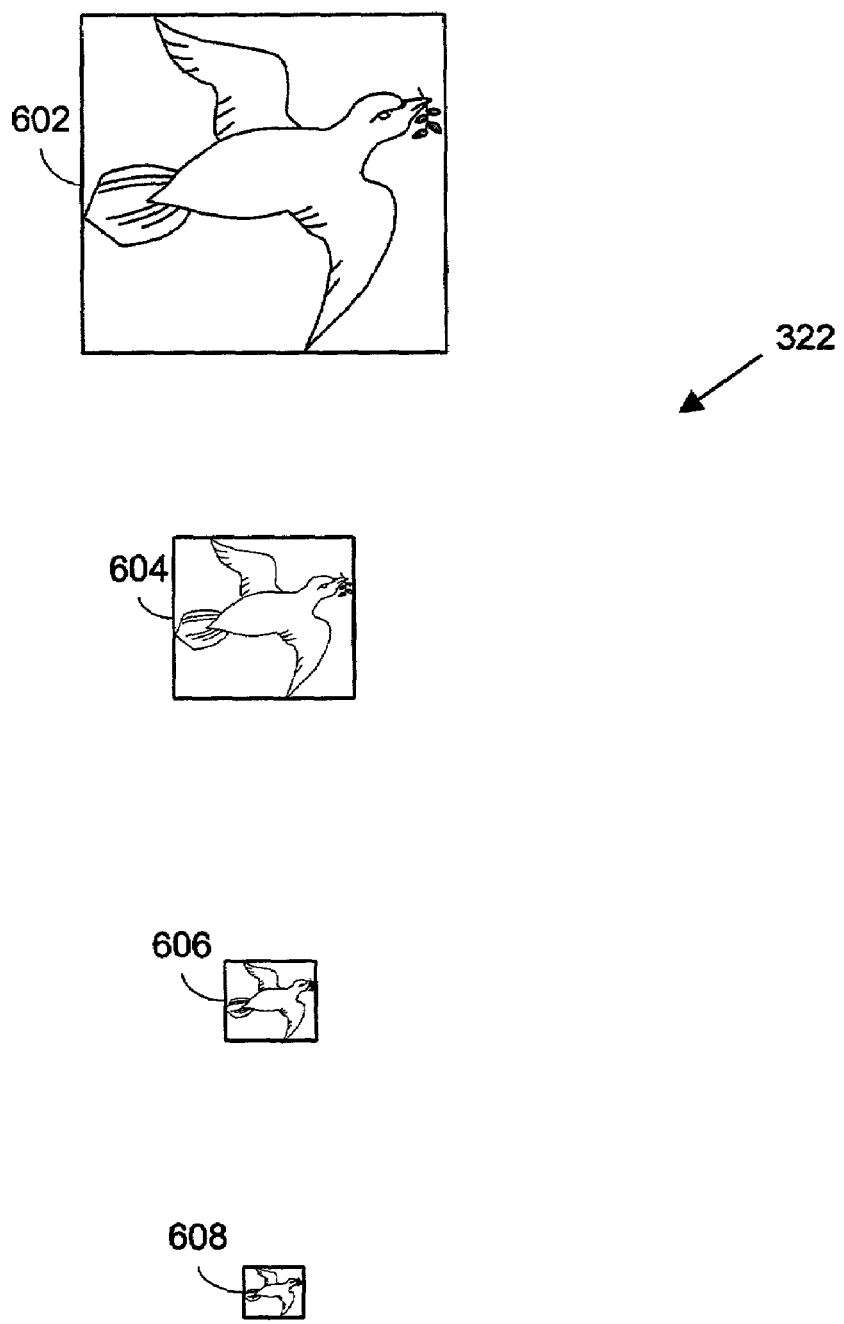
FIG. 6 is a schematic diagram showing four different resolution levels associated with an image node of the document shown in FIG. 3.

In step 216, server module 110 creates a plurality of resolution levels for one or more of nodes 312, 314, 322, 324, and 326. For example, as shown in FIG. 5, first text node 312 can have four levels of resolution, namely, highest level 502, first intermediate level 504, second intermediate level 506, and lowest level 508. Similarly, as shown in FIG. 6, first image node 322 can have four resolution levels, namely, highest level 602, first intermediate level 604, second intermediate level 606, and lowest level 608.

Accordingly, server module 110 can generate a series of representations for each node or element at progressively coarser resolutions, and containing progressively less data. It is the differences in data between successive resolutions that is pre-computed and stored, in order to minimize the amount of data that must be transmitted to client 140. Each of these representations is added to the modified tree data structure, and references are added for each region on the SLT.

For textual information, there is little point in generating multi-resolution representations. In the simplest incarnation of the new strategy, if even a portion of the text is visible, the entire text can be sent to client 140 by server 130. Entries are added to each region that contains a portion of the text. In other words, the various levels shown in FIG. 5 for first text node 312 may not be needed.

The multi-resolution strategy is most important for images. Haar wavelet bases can be used to resolve images. As noted above, client 140 initially receives only the lowest resolution version of the image. As the user pans and zooms, server 130 transmits only the new data required to render the smaller spatial regions at the higher resolutions required. In this way, full advantage is taken of data already present on client 140, and redundant transmission is minimized.

Further compression can be achieved by thresholding the wavelet basis coefficients and/or by using standard compression techniques before transmitting the data.

Client module 120 allows the user of client 140 to pan and zoom within web pages. For this purpose, it is necessary for server module 110 to generate additional information in both the modified tree data structure and the SLT. Each request from client 140 to server 130 for data is prefaced by the desired level of coarsening, C. The actual web page C is herein after referred to as level 0. Increasing C by one means rendering the page at a factor of two coarser resolution in each dimension. That is, we may imagine the representation at coarsening level C as lying on a decimated VLS of size $(L_x/2^C, L_y/2^C)$.

Server module 110 can generate a series of representations for each element at progressively coarser resolutions, and containing progressively less data. Because of the way nodes of document 300 can be organized as described above, generation of coarser resolution can be easily done. For example, an element with coordinates (x, y) and extents ($\lambda_x$, $\lambda_y$) at coarsening level 0 will have coordinates $$(\lfloor x/2^c \rfloor, \lfloor y/2^c \rfloor)$$

and extents $$(\lfloor \lambda_x/2^c \rfloor, \lfloor \lambda_y/2^c \rfloor)$$

at coarsening level C. All of this information, for C= 0, . . . , $C_{max}$ is appended to the modified tree. Note that at coarsening level C, each screen pixel represents $2^C \times 2^C = 2^{2C}$ page pixels.

Suppose that client 140 is trying to view document 300 on a screen of dimensions ($l_x$, $l_y$) pixels. In the unlikely event that $l_x \geq L_x$ and $l_y \geq L_y$, there is no problem; the screen can show the page at full C=0 resolution. More typically, $l_x < L_x$ or $l_y < L_y$, so only a coarsened rendition of the view window can be seen. A reasonable graphical user interface (GUI) strategy is then to insist that a new page be shown on the screen in its entirety, allowing the user to zoom on any part thereof. Moreover, since there is no point in letting the user zoom out any further than this, further coarsening is prohibited once the entire page is visible on the screen. Thus, server module 110 can set $$C_{max} = \lceil \log_2 \max L_x/l_x, L_y/l_y \rceil$$

Given this upper bound on C, the magnification level can be defined as $$M \equiv C_{max} - C,$$

such that magnification level M=0 corresponds to the coarsest description with the entire web page visible on the screen, and magnification level M=$C_{max}$ corresponds to the finest description possible with one page pixel per screen pixel. At coarsening level C, the web-page pixels represented on the screen are those numbered X through $X+2^C l_x - 1$, and Y through $Y+2^C l_y - 1$, inclusive. Equivalently, at magnification M, the web page pixels represented on the screen are those numbered X through $X+2^{Cmax} l_x/2^M - 1$, and Y through $U+2^{Cmax} l_y/2^M - 1$, inclusive.

The user of client 140 can zoom by incrementing the magnification level (or, equivalently, decrementing the coarsening level). As this is done, textual and graphical elements may no longer fit onto the screen, and so it is wasteful to retrieve such elements in their entirety. For textual elements, this may not be an issue because the assumption is that textual elements are usually small enough that there is little gained by subdividing them. They will need to be rendered at point size ($\lceil 2^{-C} p \rceil$, p) where p is the point size at coarsening level 0, but this is easily arranged. If $\lceil 2^{-C} p \rceil$ is less than smallest practical point size available $p_{min}$ (e.g., 5 points font size), the text is replaced with a shaded rectangle, or other placeholder.

The problem is substantially more serious for graphical elements. A 512×512 pixel graphical element at C=0 may not fit onto the screens of many wireless devices. It may first appear as a 16×16 image at C=5 which easily fits on the screen; as the user zooms, however, there will come a point where part or most of the graphical image lies outside the area viewed on the screen. Thus, it may be desirable to have the capability to retrieve all images at low magnification, but only portions of the images at higher magnifications. This can be accomplished by fragmenting images at higher magnifications. A reasonable strategy would be to regard its C=0 representation as the union of (at least) 16 images, each of size (at most) 12×6 pixels. Thus, the image is represented as a quad tree, with root at C=2, four branches at C=1, and 16 branches at C=0. Each time the user zooms, each image at level C is replaced by four images at level C−1. Not all of these four images may intersect the screen, however, so it is not necessary to retrieve all of the data at the higher magnification.

Outline of Protocol

A protocol by which the user may retrieve the document 300 for multi-resolution viewing is required. There are numerous ways to arrange this protocol, depending on whether it is desired to perform most of the computation on client 140, or on server 130. A scheme that is compute-intensive for server 130 might be:

(1) Client 140 requests document 300 from server 130. Server 130 recognizes that the request is coming from client 140 having client module 120, and shunts the request to server module 110. Client 140 includes information about its screen size and the fact that it is looking for magnification level M=0 (new request). If document 300 must be dynamically generated, server module 110 does this at this time.

(2) Server module 110 sends the coarsest ($C=C_{max}$) data to client 140, along with ancillary information about VLS 400, such as $L_x$ and $L_y$.

(3) Client 140 displays the coarsest resolution data, and begins to retrieve data from the next higher solution, or from surround areas if a M>0.

(4) If the user of client 140 pans and/or zooms, client 140 communicates the new magnification level, along with the new coordinates of the upper left-hand corner of the screen.

(5) Server 130 uses the new magnification level, the coordinates of the upper left-hand coordinates of the screen, and the screen size to determine which elements need to be sent to client 140. Server 130 then sends them, and the previous steps may be repeated.

A different strategy that is more compute-intensive for client 140 might be:

(1) Client 140 requests document 300 from server 130. Server 130 recognizes that the request is coming from a client having a client module 120, and shunts the request to server module 110. Client 140 includes information about its screen size and the fact that it is looking for magnification level M=0 (new request). If document 300 must be dynamically generated, server module 110 does this at this time.

(2) Server module 110 sends a "shadow version" of the entire M=0 modified data tree to client 140. This information includes the coordinates and extents of all elements of document 300, all textual data with $[2^{-C}p] \geq P_{min}$, but only M=0 graphical data.

(3) Client 140 displays the coarsest resolution data, and begins to retrieve data from the next higher resolution, or from surrounding areas if M>0.

(4) If the user of client 140 pans and/or zooms, client 140 uses the new magnification level, along with the new coordinates of the upper left-hand corner of the screen to compute exactly which data elements it needs that are missing from the modified tree. Client 140 then requests these by sending an appropriate identifier to server 130.

(5) Server 130 receives the request for a data file by its identifier, looks this up in a table, and sends the data to client 140.

(6) Client 140 adds the incoming data to its shadow modified tree, and displays the data.

In step 218, server module 110 prepares a plurality batches of nodes. A first batch of nodes can represent a skeleton document. Preferably, the skeleton document comprises every node of document 300, wherein each node is represented by its the lowest resolution level. For example, lowest level 608 of first image node 322 is used to represent first image node 322 in the skeleton document.

Figure 7:
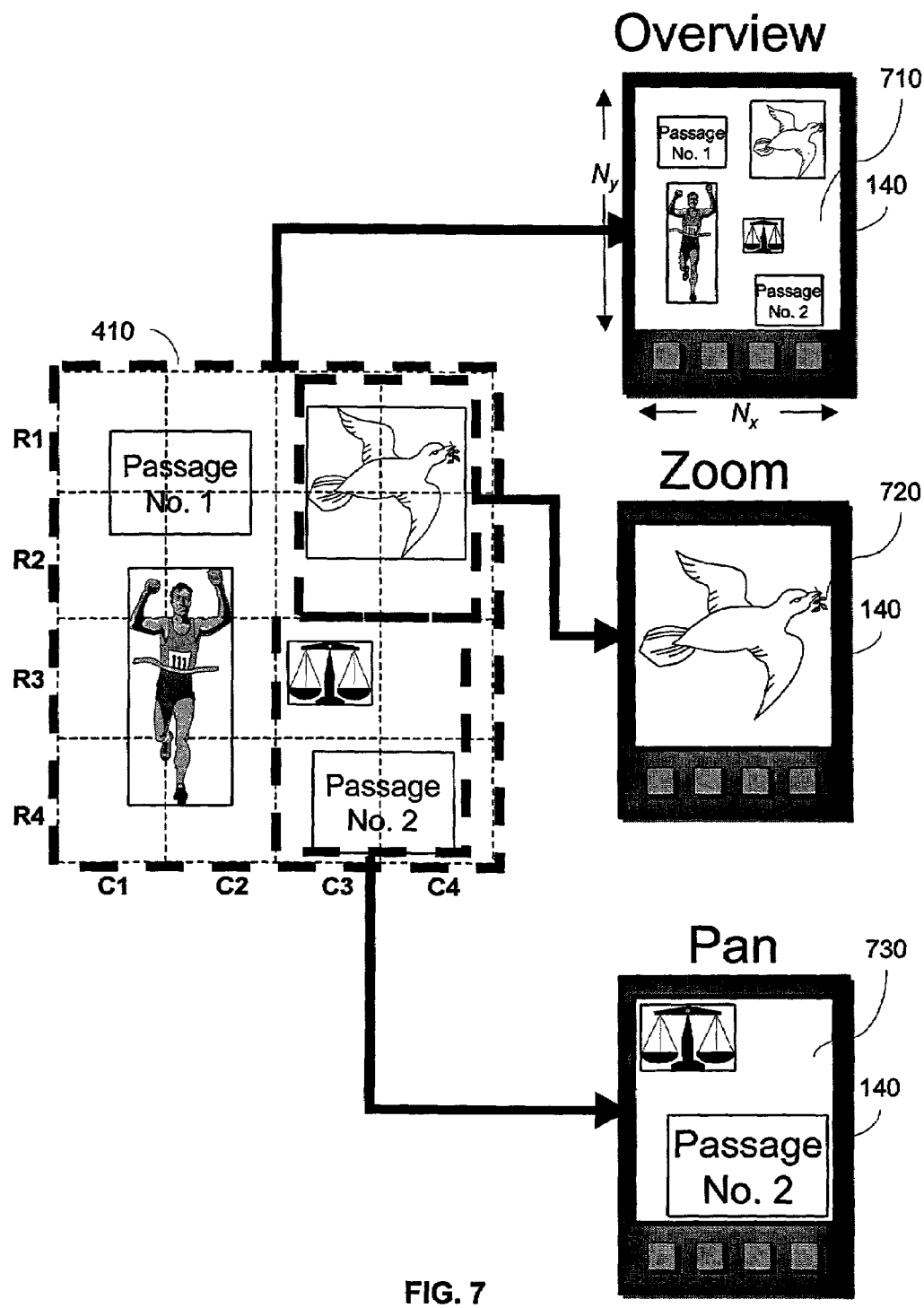
FIG. 7 is a schematic diagram showing different delivery batches of nodes associated with the document shown in FIG. 3.

In step 220, server module 110 renders the first batch of nodes of the skeleton document to be delivered by server 130 to client 140 via computer network 150. The skeleton document, when displayed on the screen of client 140 may appears as view 710 as shown in FIG. 7.

In step 222, server module 110 formulates a schedule for delivering subsequent batches of the nodes. The subsequent batches preferably comprise nodes represented in higher or finer resolution levels. The schedule can be created based on a data anticipation algorithm disclosed herein. For example, the schedule can be based on historical data indicating which of the region or regions of document 300 had been rendered most frequently to clients preceding client 140. For example, if historical data maintained by server 130 indicates that regions R1C3, R1C4, R2C3, and R2C4 had been requested by and rendered to nine out of every the preceding clients that visited the web site, then, it is likely that the current client, client 140, is also likely to view nodes associated with regions R1C3, R1C4, R2C3, and R2C4. In that case, a higher or finer resolution of first image node 332, for example, one of highest level 602, first intermediate level 604, and second intermediate level 606, would be scheduled to be delivered to client 140. Scheduling of subsequent batches for delivery is more fully described below in reference to FIGS. 8A and 8B.

If client 140 does not interrupt, i.e., the user of client 140 does nothing in step 224, the process goes to step 226 in which a subsequent batch of nodes is rendered by server module 110 to server 130 to be delivered to client 140. Depending on whether there are more batches to be delivered, steps 224 through step 228 can be repeated more than once.

Pan/Zoom User Interface (PZUI)

But if in step 224, the sequence is interrupted, for example, the user of client 140 pans or zooms as shown in FIG. 7, then the process goes to step 230. As shown in FIG. 7, the user could zoom to view a higher resolution level of second image node 324 located in regions R2C1, R2C2, R3C1, R3C2, R4C1 and R4C2. Similarly, the user could pan to view regions R3C3, R3C4, R4C3, and R4C4, which contains third image node 326 and second text node 314.

Accordingly, the user can interact with client module 120 using the PZUI. For illustration purposes, assume that client 140 has display 146 having a window that can be described by a width $N_x$ and height $N_y$. Client 140 sends to server 130 its current zoom level Z and VLS position (X, Y) of its upper left-hand corner. Server 130 uses this information to look up in the SLT the elements required by client 140, and to send their appropriate representations to client 140 panning changes X and Y, and zooming changes Z. That is, server 130 acts as a function f(X,Y,Z), accepting the current pan and zoom positions, and returning the set of elements that can be rendered at the appropriate resolutions.

In addition to panning and zooming, the user can activate hypertext links to jump to entirely different areas of document 300, or to entirely different HTML documents. In the former case, zoom level may be maintained; in the latter case, the new document is retrieved at its coarsest level of resolution.

In step 230, server module 110 fetches nodes associated with the regions associated with the user interruption in step 224 and renders the nodes in a subsequent batch. For example, if the user zooms in to second image node 324 in step 224, the highest or finest resolution of node 324 is rendered in step 230, resulting view 720 on client 140 as shown in FIG. 7. Similarly, view 730 can appear on client 140 if the user had panned to regions R3C3, R3C4, R4C3, and R4C4.

Supplements to the Basic Algorithm

Wavelet Transforms

As noted above, when graphical images are zoomed, each image at level C can be replaced by four images at level C−1. In fact, this is wasteful of information, since the image at level C was obtained by coarsening the four images at level C−1. In a low-bandwidth environment, one would prefer not to simply discard the coarse-level information, but rather to store only the differences in information between one level and the next. The wavelet decomposition of images is designed to address exactly this problem.

Suppose that pixel data a, b, c and d at coarsening level C−1 are combined to produce pixel data A at coarsening Level C. If, for simplicity, the data is eight-bit gray-scaled graphics, it might make sense to take $$A=a+b+c+d$$

Rather than retaining the four pixels at level C−1 in the modified tree, however, a server module can be adapted to retain three other linearly independent combinations thereof, e.g., $$\alpha=a+b+c+d$$

$$\beta=a-b$$

$$\gamma=c-d$$

The quantities (A, α, β, γ) are called the Haar transform of the original data (a, b, c, d). Given the coarsened data A stored at level C, and the three combinations α, β, and γ from level C−1, the client may reconstruct the four pixels by taking the inverse Haar transform, $$a=(A+\alpha+2\beta)/4$$

$$b=(A+\alpha-2\beta)/4$$

$$c=(A-\alpha+2\gamma)/4$$

$$d=(A-\alpha-2\gamma)/4$$

This procedure has resulted in a reduction by 25% of data that must be transmitted, and of server storage required. Full advantage has been taken of data already present on the client, and redundant transmission has been minimized. The procedure does not result in a reduction of client storage requirements since the client is ultimately responsible for reconstructing the data. Accordingly, the wavelet methodology places extra compute demands on the client.

As noted above, the client initially receives only the lowest resolution version of the image. Therefore, when a client zooms, finer resolution data can be requested only after all coarser resolutions of the same area have already been visited. When a client pans for M>0, however, it is possible to visit regions for which the coarser data has not yet been retrieved. If the client is responsible for identifying which data elements that it needs to fill into its own shadow version of the modified tree, however, it can recognize this situation and arrange to retrieve these coarser data elements from the server. Alternatively, if the server storage is not an issue, both the wavelet transformed and the reconstructed images at each level may be stored. In this way, a client who pans into an area for which the coarser resolution data has not yet been retrieved will be able to get everything needed to render the image at the desired level all at once.

In addition to organizing the data efficiently and reducing bandwidth requirements by 25%, the Haar transform can be used to facilitate data compression if we simply discard all transformed data below a certain threshold in magnitude. The surviving coefficients can then be processed with standard compression techniques before transmitting the data.

Data Anticipation

With respect to the version of the protocol that places more responsibility on the client, recall that, in this scheme, a shadow version of the modified tree representation of the HTML document is maintained on the client side. As the user pans and zooms, requests for data are made to this shadow tree. Whatever needed data is present in the shadow tree is rendered on the user's screen. When the shadow tree does not possess the data needed, it relays the request to the server. This sequence of activity allows for the possibility of actually anticipating future data requests by the user. This strategy takes advantage of the "dead time" associated with viewing or comprehension of previously delivered information. The point is that the shadow tree does not need to restrict its requests of the server to only what was asked of it by the client; it may try to anticipate what new information the client is going to need after the next pan/zoom operation, and request that information of the server in advance. It is also possible for some of this anticipation to be done on the server side. For example, the server may decide, based on the last request(s) that it has received and on its experience with other users' access of the same document, that the client would benefit from more information than it has requested. In either case, if the prediction is correct, the response time for the following pan/zoom operation will be dramatically improved.

For example, both panning and zooming operations are likely to have some "inertia" associated with them. If a user begins panning in a particular direction, then it is likely that they will continue to do so for some typical number of pan/zoom cycles; thus, the client may anticipate that the user will require more tiles or regions of a VLS located further along the panning vector. Likewise, if a user begins to zoom into a particular image, it is likely that they will continue to do so for some typical number of pan/zoom cycles; in this case, the client may anticipate that the user will require higher resolution Haar wavelets in a region near the fixed-point of the zoom.

The server-side anticipation may take advantage of the experience that the server has had with other user's access of the same page. This information may be garnered by the server and stored in the modified data tree. For example, if a large percentage of users who have accessed a given web page have zoomed in on a particular area or hypertext link, the server may anticipate that a given client is likely to behave the same way.

On either the client or the server side, creative statistical strategies may be used to anticipate pan/zoom actions. For example, it may be assumed that mouse movement follows a random walk with memory, such as might be described by a Langevin equation. If this assumption is true, then the evolution of the probability distribution of future mouse positions may be expected to be governed by a (possibly fractional) Fokker-Planck equation. Indeed, the "potential energy" that appears in the Langevin description may be expected to determine the probability density of the mouse in the VLS according to, for example, a Boltzmann-Gibbs distribution. This is information that may be histogrammed and stored on the server side. This approach is made all the more interesting by the fact that the space in which the random walk is taking place is not just the Euclidean plane, but rather its product with the group of its scalings.

Another example, learning algorithms, such as artificial neural networks (NN) and genetic algorithms (GA), may be employed on the server side. To implement GA's, for example, it would be necessary to find a way to parameterize a wide range of anticipation strategies by a "genome". The success or failure of different strategies will be measured by the user-response time saved—that is, by the reduction in time between a pan/zoom operation and the receipt/display by the client of all the data thus entailed. Successful strategies are allowed to "breed" with other successful strategies by taking a union of their genomes according to some procedure, perhaps with the introduction of mutations. Strategies also compete for the amount of time that they are actually employed by the server, during which they may prove their worthiness.

Caching

Because the server module decomposes an HTML document into its finest components, the caching will be performed at the component level. This is fundamentally different from other caching methods that are being used for the similar purpose. These methods cache information at an object level, which means at the HTML document or the image links. Whereas, the server module of the present invention caches at the level of HTML nodes or components. This process can be performed for other types of components, such as vector graphics.

The performance advantage over that of object level caching can be characterized by the differences in the size of a whole HTML document versus a set of components from the document. Thus, this ratio might be as high as 20 to 40 times.

The server module and the client module would uniquely cache each component, so that they can be reused when the document is recalled. In the case of the server module, using the file/path name of the HTML document as a unique identifier, a basic difference check would be performed against a previous version of the document with the same identifier. This would alleviate the need to transmit the entire document. The server that has cached the document, would deliver only those components that have changed and reuse the cached components. Likewise, this process would be performed for other objects such as an image. Also the server module, in memory or in a very fast storage facility such as a solid state disk, the finer grain of caching would greatly minimize the cache size and maximize the cache hit-ratio. With the client module, a basic two-level cache storage mechanism could be employed to reference a component for a given HTML document. For example, given a unique URL, a directory by the URL could be created and the components that make up the URL referenced document would be stored there for quick recall.

Given the overhead with finer grain caching, one could also adopt buffered cache storage scheme on the client side so as to minimize the number of disk input/output (I/O) operations. So when the buffer is full, the components in the buffer would be flushed.

Although document 300 is described above as an HTML document, document 300 can be a document having one of several formats, including without limitation, XML, PDF, Flash, MS Words, Postscripts, and the like.

Specific Preferred Embodiments

Figure 8A:
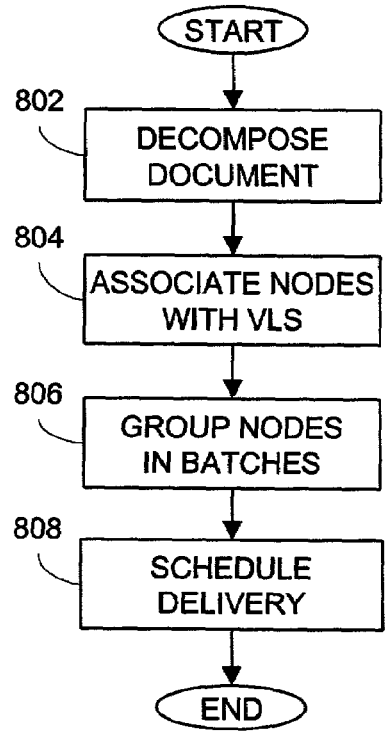
FIG. 8A is a flowchart showing the steps involved in using a preferred embodiment of the present invention by a first computer to prepare a document for deliver to other computers over a computer network.

FIG. 8A is a flowchart showing the steps involved in using the first preferred embodiment of the present invention by a first computer to prepare a document for deliver to other computers over a computer network. The first computer may be a server computer associated with a content provider that owns the document. One of the other computers may be a client computer associated with a user. Preferably, the computer network is the Internet over which the first and the client computer can communicate using TCP/IP.

The document may be an HTML document or another document having a document model. For illustration purposes, the document has a width of 768 pixels and a height of 1024 pixels. Furthermore, it is assumed that the document model comprises a tree data structure having a plurality of components or nodes.

In step 802, the first computer decomposes the document. Decomposition of the document is made in accordance with the document structure associated with the document. The decomposition step results in a plurality of nodes. Each of the nodes has a node width that is narrower than 768 pixels and a node height that is shorter than 1024 pixels. Each of the nodes is assigned a node number.

Figure 8B:
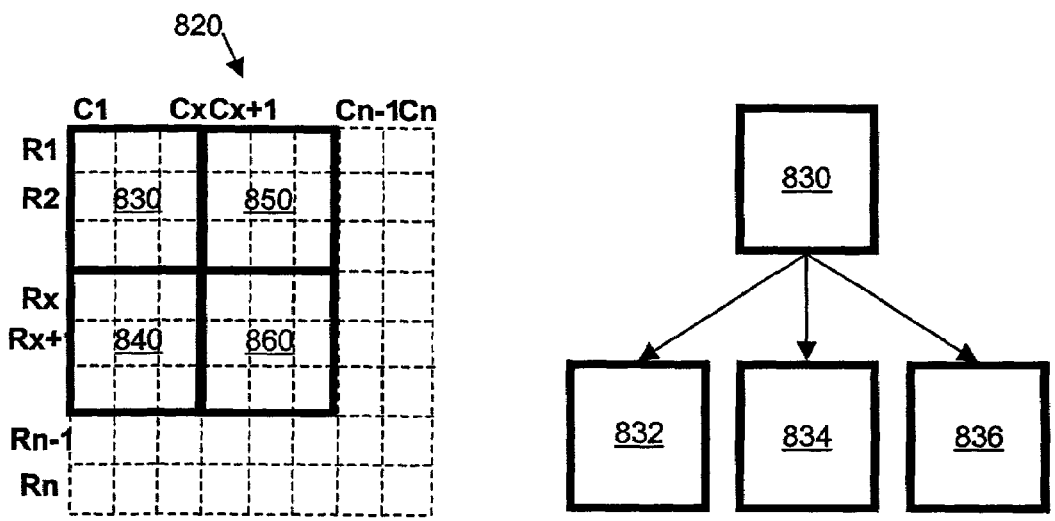
FIG. 8B is a schematic diagram showing a VLS associated with a document.

In step 804, each of the nodes is associated with a region of a VLS. For illustration purposes, the VLS may be VLS 820 shown in FIG. 8B. VLS 820 has a width of 768 pixels and a height of 1024 pixels. Each region of the VLS has a width of 32 pixels and a height of 32 pixels. For example region R1C1 is 32 pixels by 32 pixels. Accordingly, VLS 820 has 32 "rows" (1024/32, namely, R1 through R32) and 24 "columns" (768/32, namely, C1 through C32), resulting in a total of 768 regions or tiles. In FIG. 8B, Rn represents R32 and Cn represents C24. Rx is a row between R1 and R32, and Cx is a column between C1 and C24. Depending on the size of the nodes, one node may be associated with one or more regions of VLS 820. However, not every region is associated with a node.

In step 806, the server groups the nodes in a plurality of batches. They are a large number of combinations in which the nodes may be grouped. For example, first batch 830 may comprise nodes associated with regions R1C1, R1C2, R1C3, R2C1, R2C2, R2C3, R3C1, R3C2, and R3C3; second batch 840 may comprise nodes associated with regions R4C1, R4C2, R4C3, R5C1, R5C2, R5C3, R6C1, R6C2, and R6C3; third batch 850 may comprise nodes associated with regions R1C4, R1C5, R1C6, R2C4, R2C5, R2C6, R3C4, R3C5, and R3C6; fourth batch 860 nodes associated with regions R4C4, R4C5, R4C6, R5C4, R5C5, R5C6, R5C6, R6C5, and R6C6. Although each batch depicted in FIG. 8B comprises nine regions, each batch can comprise a number of regions ranging between one and 768. Furthermore, although batches 830, 840, 850, and 860 are depicted as having the same number of regions, i.e., nine each, different batches may have different number of regions. Each batch preferably can be delivered and rendered so as to the latency limit.

In step 808, the first computer schedules the plurality of batches for delivery, one batch at a time. There are a large number of combinations in which the various batches can be scheduled for delivery. For example, a first schedule may comprise the sequence of delivering in the order of batches 830, 840, 850, and 860. A second schedule may comprise the sequence of delivering in an alternative order of batches 830, 850, 840, and 860. Other schedules comprising different sequence of delivery are possible.

In addition, nodes represented in each batch may be rendered in one of several levels of resolutions. For example, first batch 830 may have three levels of resolutions. For illustration purposes, first batch 830 can comprise three sub-batches, namely low resolution batch 832, intermediate resolution batch 834, and high resolution batch 836. An alternative schedule in step 808 may comprise delivering first batch 830 in the sequence of sub-batches 832, 834, and 836.

Figure 9:
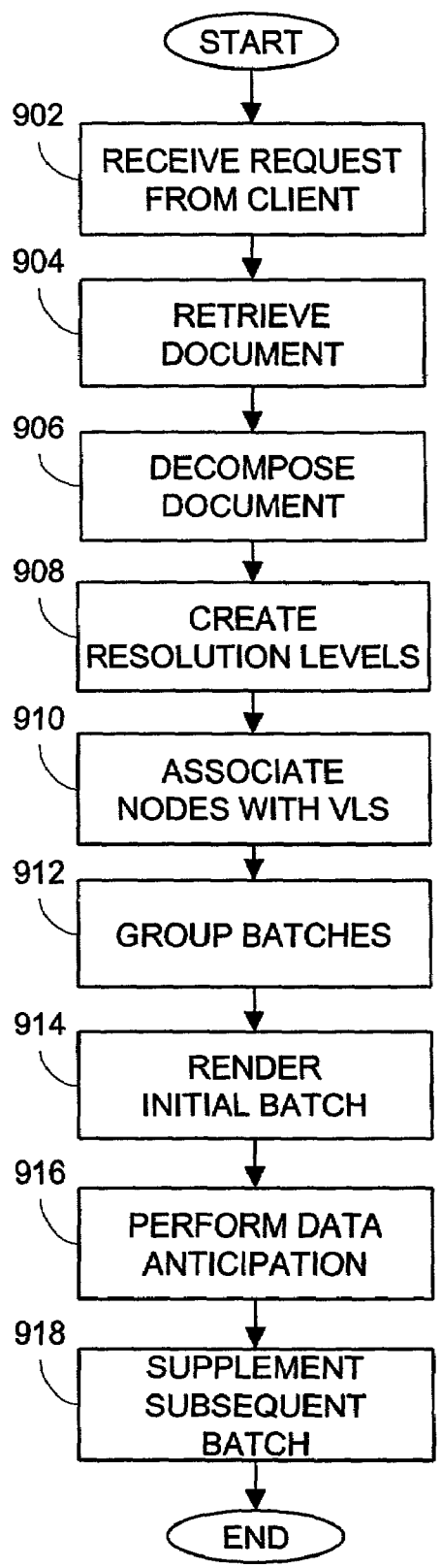
FIG. 9 is a flowchart showing the steps involved in using a second preferred embodiment of the present invention by a first computer to deliver a document in response to a request for the document from a second computer over a computer network.

FIG. 9 is a flowchart showing the steps involved in using the second preferred embodiment of the present invention by a first computer to deliver a document in response to a request for the document from a second computer over a computer network. In step 902, the request for the document is received. Receipt of the request can take place through known methods and protocols. In a specific example in which the computer network is the Internet running on TCP/IP, for example, the request can be made when the URL associated with the first computer is submitted by the second computer. The request can also be initiated by the second computer when its user otherwise requests for the document, e.g., clicking on a hyperlink or typing in a filename of a document.

In step 904, the first computer retrieves the document. The document may be retrieved from, for example, a storage device, a flash memory, a cache memory, a proxy server, etc.

In step 906, the document is decomposed. Decomposition of the document may be performed as described above in reference to step 210 of FIG. 2.

In step 908, the first computer create a plurality of resolution levels for selected nodes. The selected nodes are preferably those with a size larger than about four kilobytes. Preferably, the selected nodes are image nodes. For text nodes smaller than about one kilobyte, it is unnecessary to create multiple resolution levels. Step 216 described above may be used.

In step 910, each of the nodes from the preceding step is associated with a region of a VLS. This step may be performed as described above in reference to steps 212 and 214 of FIG. 2. In an exemplary embodiment, an SLT is used to associate the nodes and the VLS. Step 912 may be performed as described in step 806 above.

In step 914, the first computer renders to the second computer an initial batch of nodes. The initial batch of nodes can comprise all or some regions of the VLS. In an exemplary embodiment, the initial batch of nodes is a skeleton document comprising all regions of the VLS. Each node of the skeleton document is represented in the lowest resolution level created in step 908.

In step 916, one or both of the first and the second computers can perform a data anticipation analysis using the methods and algorithms disclosed herein. For example, the data anticipation analysis may be performed by the server computer by reviewing information related to how the document has been previously rendered to other client computers. For example, if a number of other computers had previously requested the document, and nodes associated with a specific region of the VLS were supplemented to those other computers most or all of the times, then the data anticipation analysis would results in the first computer preparing a subsequent batch comprising those nodes.

Alternatively, the second computer can monitor how the initial batch of nodes is manipulated by the user of the second computer. The second computer can then request the first computer to render nodes associated with specific regions of the VLS based on the monitoring.

In step 918, the first computer supplements the second computer with a subsequent batch of nodes. The subsequent batch of nodes are preferably represented in a finer or higher resolution level that was created in step 908.

Figure 10:
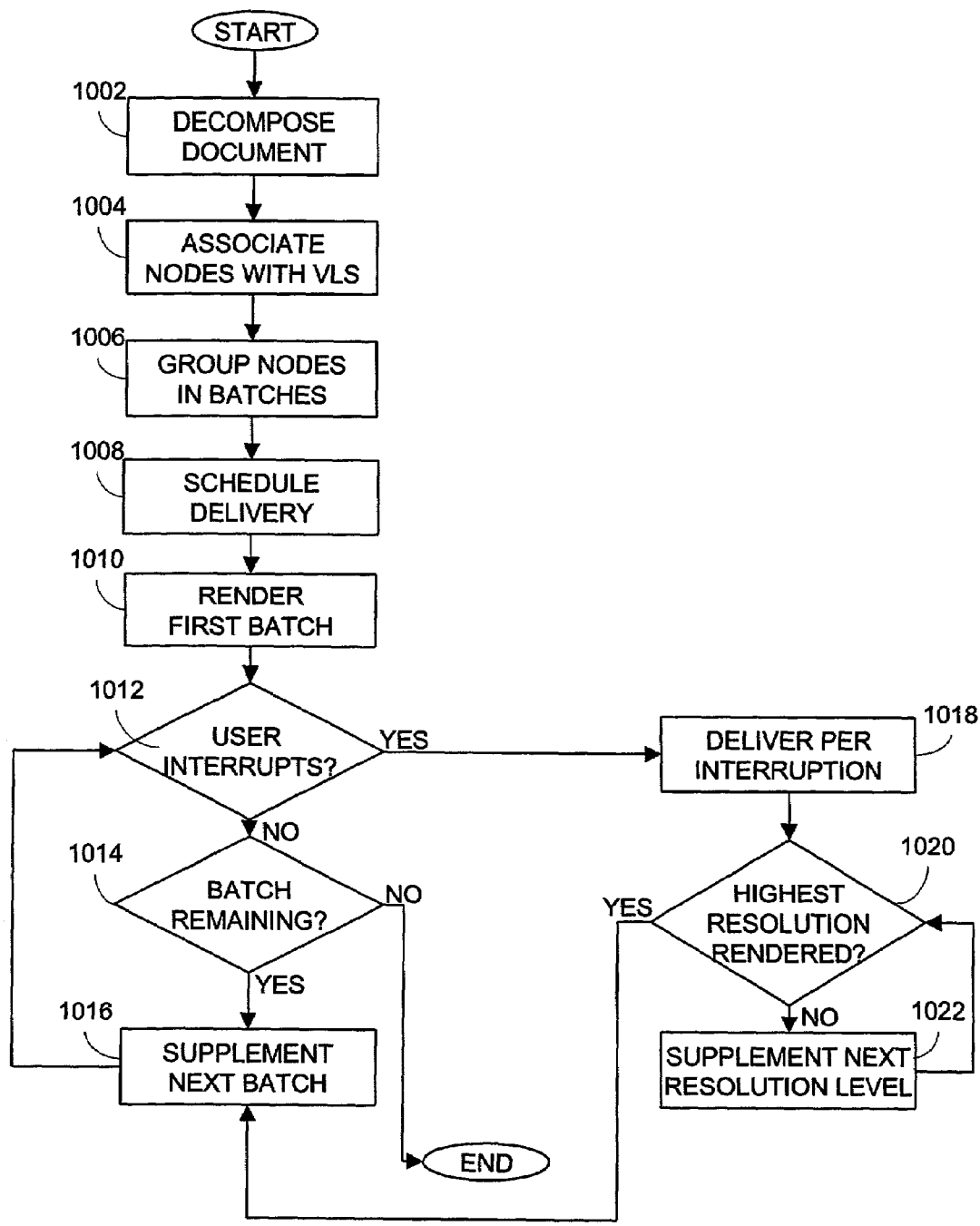
FIG. 10 is a flowchart showing the steps involved in using a third preferred embodiment of the present invention.

FIG. 10 is a flowchart showing the steps involved in using the third preferred embodiment of the present invention.

Step 1002 through 1008 can be identical to corresponding steps 802 through 808 shown in FIG. 8A and described above.

In step 1010, the first batch is rendered to the second computer. Steps 1012 through 1016 are repeated as long as the user of the second computer does not interrupt in step 1012 and there are batches remaining in step 1014. Step 1016 is performed in accordance with the schedule prepared in step 1008.

If in step 1012 the user of the second computer interrupts, for example, the user pans or zooms or otherwise make a different request, the process goes to step 1018. In step 1018, the first computer deliver additional information in accordance with the interruption of step 1012. For example, if the user clicks on a specific node in step 1012, then a higher resolution of that node will be rendered in step 1018. Steps 1020 and 1022 are repeated until the highest resolution of that node is rendered. If in step 1020 it is determined that the highest resolution level for that specific node had been rendered, the process goes to step 1016.

Figure 11:
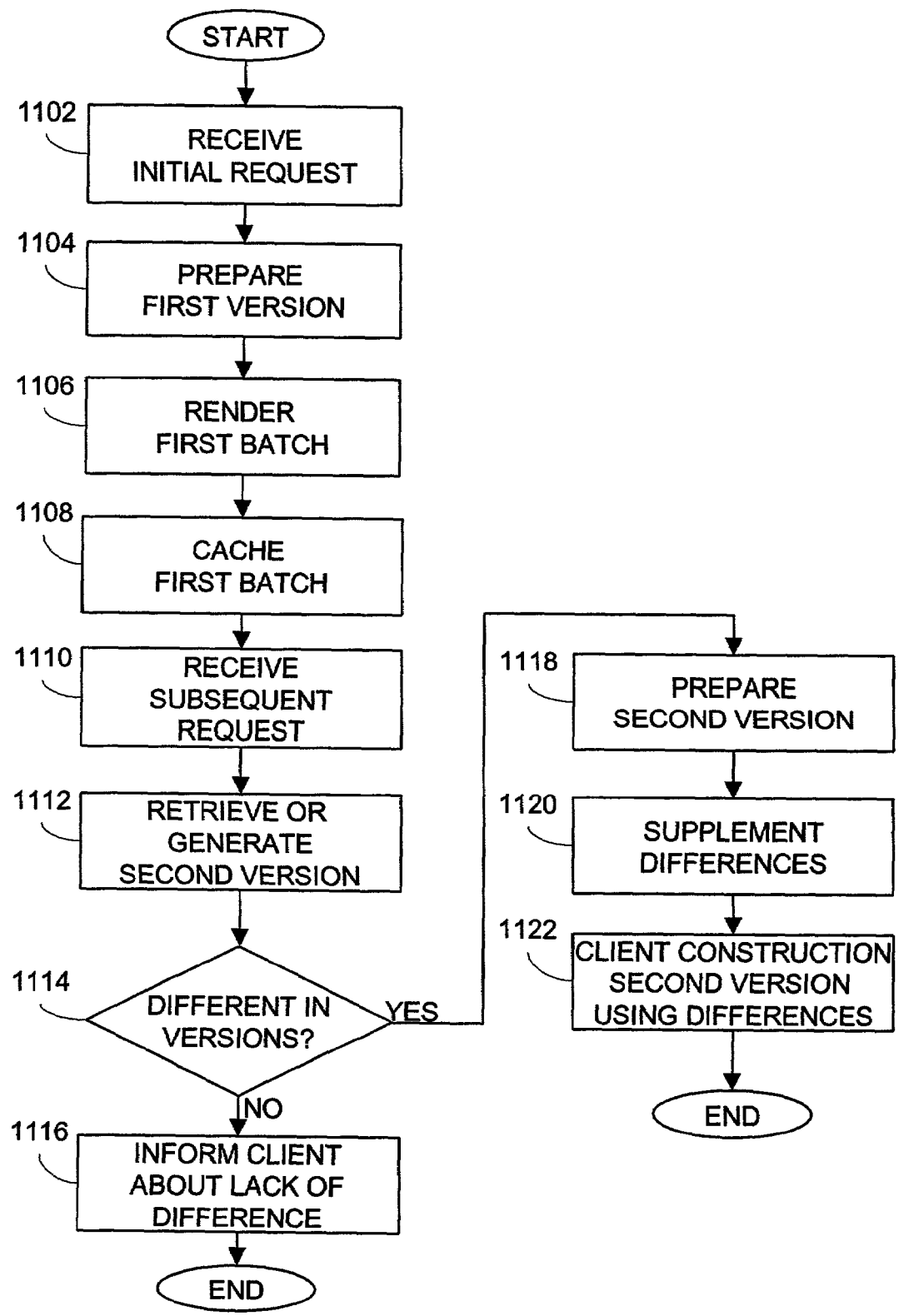
FIG. 11 is a flowchart showing the steps involved in using a fourth preferred embodiment of the present invention.

FIG. 11 is a flowchart showing the steps involved in using the fourth preferred embodiment of the present invention. This embodiment is suitable for dynamically generated documents. For example, the document may be the homepage of a newspaper or another content provider that frequently updates the document.

In step 1102, a request for a first version of a document is received by a first computer from a second computer.

In step 1104, the first version of the document is prepared by the first computer in accordance with the present invention. For example, the first version may be prepared by decomposing it into nodes, and associating the nodes with regions of a VLS. Preparation may also include generating the first version dynamically, as in the case in many applications.

In step 1106, the first computer renders the first batch of nodes to the second computer.

In step 1108, the first batch of nodes is cached by both of the first and the second computers. The first batch of nodes is then treated by the first and second computers as the baseline document.

In step 1110, a subsequent request from the second computer for the same document is received by the first computer. The second request may be received after a certain period of time has elapsed since the first request was received.

In step 1112, the first computer retrieves or regenerates a second version of the document. In step 1114, the first computer compares the nodes of the of the second version with those of the baseline document. The first computer then determines the differences between the nodes of the second versions with those of the baseline document. If no update was made to the document between the first and the second requests, it would not be necessary for the first computer to supplement any information to the client, in which case the process goes to step 1116.

But if some nodes of the document have been updated in the second version, the process goes to step 1118. In step 1118, the first computer prepares a second batch of nodes. The second batch comprises only the delta or the differences between the baseline document and the second version of the document.

In step 1120, the second batch is supplemented or provided by the first computer to the second computer.

In step 1122, the first and the second computers update the baseline document. The second computer can then display the new baseline document to its user.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that

What we claim is:

1. A method for delivering a document by a first computer to a second computer over a computer network, the method comprising:

decomposing the document into nodes in accordance with a document model of the document;

associating each of the nodes with at least one region of a virtual layout space of the document model, wherein the nodes comprise a plurality of resolution levels;

delivering an initial batch of nodes to the second computer, wherein the initial batch of nodes comprises at least one node in a first resolution level of the plurality of resolution levels; and if the second computer does not interrupt, supplementing the second computer with a subsequent batch of nodes based on a data anticipation analysis, wherein the subsequent batch of nodes comprises the at least one node in a second resolution level that is finer than the first resolution level, and wherein the data anticipation analysis is performed by the first computer based at least in part on how the document had been previously delivered to other computers.

2. The method of claim 1, wherein the initial batch of nodes comprises nodes represented by its lowest resolution level.

3. The method of claim 1, wherein the supplementing is based on a data anticipation algorithm.

4. The method of claim 1, further comprising the step of grouping the nodes in a plurality of batches, wherein each of the plurality of batches comprises at least one node.

5. The method of claim 4, wherein one of the plurality of batches comprises all the nodes, wherein all or some of the nodes are represented in the coarsest resolution of the one or more resolution levels.

6. A method for delivering a document by a first computer to a second computer over a computer network, the method comprising:

receiving a request for the document from the second computer;

retrieving the document from a memory, wherein the document comprises a document model;

decomposing the document into a plurality of nodes in accordance with the document model;

creating a plurality of resolution levels for one or more of the plurality of nodes;

associating each of the plurality of nodes with at least one region of a virtual layout space;

delivering an initial batch of nodes to the second computer, wherein the initial batch comprises nodes in a coarse resolution of the plurality of resolution levels; and based on a data anticipation analysis, supplementing the second computer with a subsequent batch of nodes, wherein the data anticipation analysis is performed by the first computer based at least in part on how the document had been previously delivered to other computers and wherein the subsequent batch comprises nodes in a finer resolution of the plurality of resolution levels.

7. The method of claim 6, further comprising the step of grouping the initial and subsequent batches in accordance with characteristics of the second computer, wherein the characteristics comprise one or more of a number of bits for color, a clock speed of central processing unit, a screen size, and a network connectivity associated with the second computer.

8. The method of claim 6, wherein the data anticipation analysis is performed by the second computer based at least in part on how the initial batch is manipulated by a user of the second computer.

9. The method of claim 6, wherein the associating step comprises a spatial lookup table.

10. The method of claim 6, wherein the virtual layout space can be adjusted to conform to a screen size of the second computer.

11. The method of claim 6, wherein each of the initial and subsequent batches comprises one or more regions of the virtual layout space.

12. A system for preparing a document for delivery over a computer network comprising:

a memory in communication with the computer network, wherein the memory contains the document; and a first computer in communication with the computer network and the memory, wherein the first computer is adapted to receive a request for the document from a second computer over the computer network and to obtain characteristics associated with the second computer, wherein when the request is received from the second computer, the first computer retrieves the document from the memory, decomposes the document into a plurality of nodes in accordance with a document model associated with the document, associates the plurality of nodes with one or more regions of a virtual layout space, creates a plurality of resolution levels for one or more of the plurality of nodes, renders to the second computer a first number of the plurality of nodes represented in a coarse resolution suitable for the client, supplements the second computer with a second number of the plurality of nodes represented in a finer resolution based on a data anticipation analysis, wherein the data anticipation analysis is based at least in part on how nodes of the document have been previously rendered by the first computer to other computers prior to the reauest from the second computer.

13. The system of claim 12, wherein the characteristics comprise one or more of a number of bits for color, a clock speed of central processing unit, a screen size, and a network connectivity associated with the second computer.

14. The system of claim 12, wherein each of the plurality of nodes is associated with at least one region of the virtual layout space.

15. The system of claim 12, wherein the virtual layout space is as large as a screen size of the document.

16. The system of claim 12, wherein a spatial lookup table is used to associate the plurality of nodes with the one or more regions of the virtual layout space.

17. A method for delivering a document by a first computer in response to a request for the document from a second computer over a computer network, the method comprising the steps of:

decomposing the document into a plurality of nodes in accordance with a document model associated with the document;

associating each of the plurality of nodes with one or more regions of a virtual layout space, creating a plurality of resolution levels for one or more of the plurality of nodes, wherein the plurality of resolution levels comprises at least a coarse resolution, a medium resolution, and a fine resolution;

preparing a skeleton document comprising one or more of the plurality of nodes represented in the coarse resolution;

rendering the skeleton document to the second computer;

anticipating which region of the virtual layout space that the second computer is likely to view next based at least in part on how the skeleton document is manipulated by a user of the second computer;

delivering nodes represented in the medium resolution based on a result of the anticipating step; and delivering nodes represented in the fine resolution if the user specifically selects a region associated with the nodes.

* * * * *